United States Patent [19]

Allen

[11] 4,027,850
[45] June 7, 1977

[54] SOLENOID VALVE

[75] Inventor: Walter E. Allen, Prospect, Conn.

[73] Assignee: Peter Paul Electronics Co., Inc., New Britain, Conn.

[22] Filed: Sept. 5, 1975

[21] Appl. No.: 610,748

[52] U.S. Cl. .................... 251/141; 251/129
[51] Int. Cl.² .......................... F16K 31/06
[58] Field of Search .................. 251/129, 141

[56] References Cited

UNITED STATES PATENTS

| | | | |
|---|---|---|---|
| 1,323,778 | 12/1919 | Lemp | 251/141 X |
| 3,004,720 | 10/1961 | Knapp et al. | 251/141 X |
| 3,632,081 | 1/1972 | Evans | 251/129 |
| 3,737,141 | 6/1973 | Zeuner | 251/129 |
| 3,818,927 | 6/1974 | Zeuner | 251/129 X |
| 3,827,672 | 8/1974 | Stampfli | 251/129 |

Primary Examiner—Arnold Rosenthal
Attorney, Agent, or Firm—McCormick, Paulding & Huber

[57] ABSTRACT

A solenoid-operated fluid control valve has an armature assembly which includes a reciprocally moveable impact plunger and a seal pin reciprocally mounted in the plunger and projecting therefrom. A valve insert defines a valve seat and has an integral a guide portion which includes a bore slidably receiving an associated projecting portion of the seal pin therein to guide it into seating engagement with the valve seat and to maintain it in alignment with the valve seat at all times.

6 Claims, 4 Drawing Figures

SOLENOID VALVE

BACKGROUND OF THE INVENTION

This invention relates in general to solenoid-operated control valves and deals more particularly with valves of so called impact type which may operate at relatively high pressures.

A conventional valve of the foredescribed general type includes an armature assembly which comprises an impact plunger and a valve element or seal pin for seating engagement with a valve seat. Upon energization of a solenoid to operate the valve the impact plunger travels for some distance relative to the seal pin before engaging it. This unrestricted or free plunger travel allows the plunger to accelerate before engaging the seal pin whereby to exert sufficient impact upon the pin to unseat it even under conditions of relatively high pressure. Since the armature assembly or operating portion of the valve necessarily comprises a plurality of relatively moveable parts, problems have been encountered in securing positive alignment between the parts to assure a high degree of sealing integrity over a wide range of valve operating pressures and particularly in the low pressure range where a high pressure differential is not available to aid in plastic deformation of the seal pin to effect tight sealing engagement with the valve seat.

SUMMARY OF THE INVENTION

In accordance with the present invention an improved solenoid-operated impact valve is provided which has an armature assembly including a reciprocally movable impact plunger and a seal pin reciprocally mounted in the plunger and projecting from the plunger. The valve further includes means defining a valve seat and an integral seal pin guide surface which surrounds an associated projecting portion of the seal pin to guide it into seating engagement with the valve seat and to maintain it in precise alignment with the valve seat at all times.

DETAILED DESCRIPTION OF PREFERRED EMBODIMENT

Figure 1:
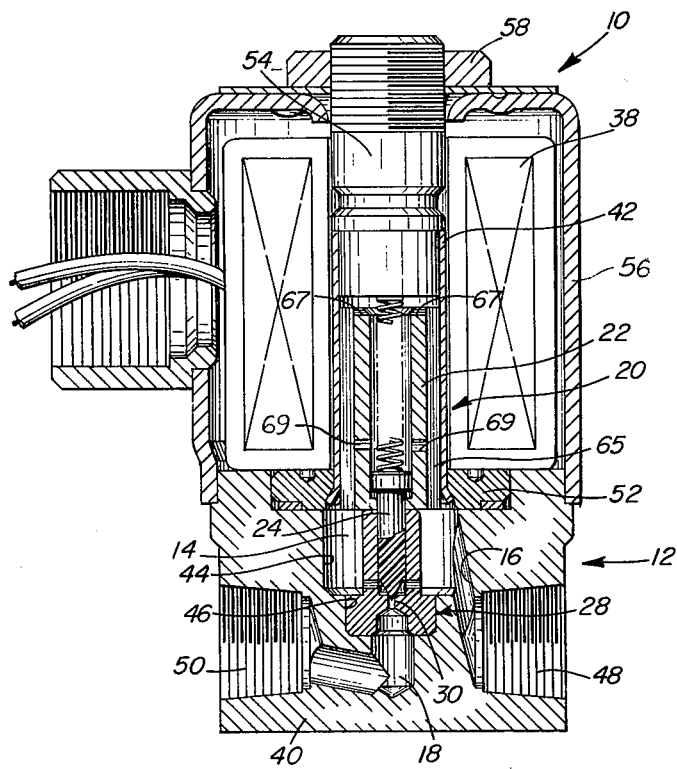
FIG. 1 is a vertical sectional view through a solenoid-operated fluid control valve embodying the invention.

Turning now to the drawing and referring particularly to FIG. 1 a solenoid-operated control valve embodying the present invention is designated generally by the numeral 10. The valve 10 comprises a high pressure impact type valve particularly adapted for use in a fluid control system and has a valve body indicated generally at 12 which defines a valve chamber 14 and inlet and outlet passageways indicated at 16 and 18, respectively, which communicate between the chamber 14 and the exterior of the valve body 12. An armature assembly indicated generally at 20 and contained within the chamber 14 includes a reciprocally movable impact plunger 22 and a seal pin 24 reciprocally mounted in the plunger. A portion of the seal pin projects from the plunger and defines a seating surface 26. A valve insert indicated generally at 28 and mounted in a valve body 12 defines an outlet orifice 30 at the inner end portion of the outlet passageway 18 and a valve seat 32 which surrounds the outlet orifice. The valve insert 28 further defines a guide surface 34 which surrounds an associated projecting portion of the seal pin 24 to guide its movement toward and away from the valve seat 32 and to maintain seating surface 26 in alignment with the valve seat 32. A compression spring 36 contained within the chamber yieldably urges the seal pin toward sealing engagement with the valve seat 32. The valve 10 further includes a solenoid 38 mounted on the valve body 12 for moving the plunger 22 into impact engagement with the seal pin 24 to unseat the seal pin whereby to permit fluid to flow through the valve 10 from the inlet passageway 16 to and through outlet orifice 30 and to and through the outlet passageway 18.

Considering now the valve 10 in further detail, and as oriented in FIG. 1, the valve body 12 includes a generally cylindrical base 40 and an axially elongated tubular sleeve 42 connected to the base and extending upwardly therefrom. A generally cylindrical upwardly opening recess 44 formed in the base 36 defines a lower portion of the chamber 14. The base also has a generally cylindrical upwardly opening cavity 46 for receiving the valve insert 28. A pair of diametrically opposed internally threaded fluid ports 48 and 50 communicate, respectively, with a inlet and outlet passageways 16 and 18 for connecting the valve 10 in an associated hydraulic system. The upper portion of the chamber 14 is defined by the sleeve 42 made from substantially non-magnetic material and threadably connected the base 40 by an annular connecting nut 52. The sleeve 42 is closed at its upper end by a plug 54 welded or otherwise secured therein. The solenoid 38 comprises an annular magnet coil which surrounds the sleeve 42. A housing 56 cooperates with the base 40 to generally enclose the magnet coil 38 and is retained in assembly with the valve body 12 by a retaining nut 58 which threadably engages the upper end of the plug 54.

Figure 2:
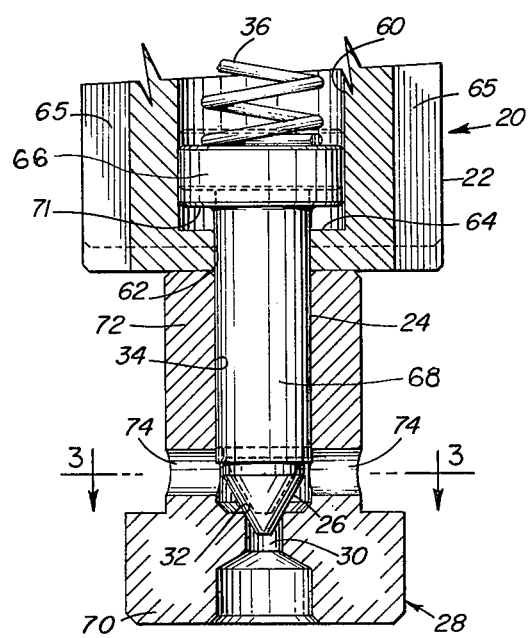
FIG. 2 is a somewhat enlarged fragmentary vertical sectional view of the armature assembly and valve insert of the solenoid shown in FIG. 1.

Referring now to the armature assembly 20 and particularly to FIG. 2, the impact plunger 22 comprises a generally cylindrical member made from magnetic material and coaxially received within the sleeve 42 for axial reciprocal sliding movement therein. A stepped bore 60 extends coaxially through the plunger 22 and includes a reduced diameter portion 62 at its lower end. An annular shoulder 64 provides transition between the bore portions and defines an axially upwardly facing abutment surface near the lower end of the plunger. Longitudinally extending grooves or flutes 65, 65 open through the peripheral surface of the plunger and communicate with radial extending grooves 67, 67 in the upper end thereof to provide for the passage of fluid upwardly within the sleeve 42 and into the bore 60. The plunger 22 also has radially extending apertures 69, 69 therethrough which communicate between the bore 60 and the grooves 65, 65.

The seal pin 24 is preferably made from a plastic material such as KEL-F, TEFLON, DELRIN or the like and has an enlarged generally cylindrical head 66 slidably received in the main portion of the plunger bore 60 and a generally cylindrical shank portion 68 slidably received in the bore portion 62 and projecting downwardly therefrom. The lower surface of the head 66 defines a downwardly facing abutment surface 71 and lower end of the shank portion 68 defines the seating surface 26 which is preferably generally conical, as shown. The seal pin 24 is supported for axial reciprocal movement relative to the plunger 22 and is yieldably urged toward the valve seat 32 by the spring 36 which acts between the head 66 and the plug 54.

Figure 4:
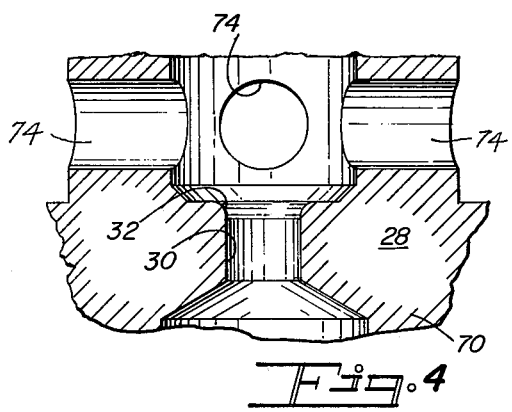
FIG. 4 is a somewhat further enlarged fragmentary sectional view through the valve insert.
Figure 3:
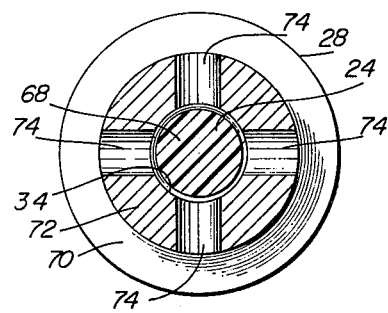
FIG. 3 is a fragmentary sectional view taken along the line 3—3 of FIG. 2.

The valve insert 26 is preferably machined from metal and has an enlarged cylindrical body portion 70 adapted for press fit assembly within the cavity 46. The insert further includes an integral upwardly projecting cylindrical guide portion 72 which defines an abutment surface 73. A coaxial stepped bore extends through the insert 26 and includes an upper portion which defines the cylindrical guide surface 34 which surrounds an associated projecting portion of the seal pin shank 68. A lower portion of the insert bore comprises the orifice 30 which defines the inner end of the fluid outlet passageway 18. The valve seat 32 which surrounds the inner end of the orifice 30 has a generally radial chamber, as best shown in FIG. 4. A plurality of radial holes 74, 74 formed in the guide portion 72 communicate with the insert bore immediately above the valve seat 32, as best shown in FIG. 2.

When the solenoid 38 is de-energized the plunger 22 is in its full line position of FIG. 2 and the lower end of the plunger rests upon the upper end of the insert guide portion 72. The spring 32 acts upon the seal pin head 66 to urge the seating surface 26 into sealing engagement with the valve seat 32 thereby preventing fluid flow from the chamber 14 to and through the orifice 30 and the outlet passageway 18. The inlet passageway 16 is at all times in communication with the chamber 14. The resulting pressure differential acting across the sealing area at 32 (FIG. 2) further maintains the seal pin in tightly sealed engagement with the valve seat 28. Energization of the solenoid 38 causes the plunger 22 to move upwardly within the chamber 14 to its broken line position of FIG. 2. The plunger 22 is movable relative to the seal pin during an initial portion of its upward travel and is free to accelerate an upward direction relative to the seal pin 24 until the plunger abutment surface 64 engages the seal pin abutment surface 71 whereupon impact of the plunger striking the pin serves to unseat the pin which then moves upwardly with the plunger allowing fluid to flow from the chamber 14 through the holes 74, 74 to and through the orifice 30 and to and through the outlet passageway 18. Fluid will continue to flow through the valve 10 from the inlet passageway 16 and to and through the outlet passageway 18 until the solenoid 34 is de-energized. Upon de-energization of the solenoid the spring 32 urges the seal pin to its seated position to block the orifice 30 whereupon fluid flow through the valve 10 is interrupted until the solenoid 34 is again energized.

The insert 26 provides a guide surface 34 precisely concentrically machined relative to the valve seat 32 to assure positive alignment of the seating surface 26 with the valve seat 32 at all times, which makes it possible to achieve the necessary amount of plastic deformation in the area of contact between the seating surface 26 and the valve seat 32 to effect a tight seal between the seal pin 24 and the valve seat 32 even where high fluid pressure differential is not available to aid in deformation.

I claim:

1. The combination comprising an armature assembly and a valve seat insert for a solenoid operated fluid control valve, said armature assembly including an impact plunger and a seal pin mounted in said plunger for reciprocal movement relative thereto and having a cylindrical shank portion projecting outwardly from said plunger, said seal pin having a seating surface at its outer end, said insert having a base portion for assembly in a cavity in the body of the control valve and an integral guide portion projecting inwardly from said base portion and toward said impact plunger, said guide portion having a generally radially disposed abutment surface at its inner end for abutting engagement with an associated outer end portion of said impact plunger, said insert having a stepped cylindrical bore extending therethrough in coaxial alignment with said cylindrical shank portion for communicating with an outlet passageway in the valve body, said bore having an outer end portion defining an outlet orifice and a valve seat, said valve seat surrounding the inner end of said outlet orifice, said bore including a diametrically enlarged inner end portion defining a seal pin guide surface and having a diameter substantially equal to the diameter of said cylindrical shank, said enlarged inner end portion receiving an associated portion of said cylindrical shank for sliding movement therein, said seating surface being movable into and out of engagement with said valve seat, said impact plunger being movable relative to said seal pin and said base when said seating surface is in engagement with said valve seat, said seal pin guide surface being in surrounding sliding engagement with an associated portion of said clindrical shank at all times when said insert-armature assembly is assembled in said control valve and guiding said seal pin in its movements toward and away from said valve seat, said guide portion having a generally radially extending hole therethrough communicating with a chamber of the control valve and with said enlarged bore portion immediately inwardly of said valve seat and cooperating with said enlarged bore portion, said valve seat and said orifice to provide a fluid flow path from the chamber to the outlet passageway when said seating surface is out of engagement with said valve seat.

2. The combination as set forth in claim 1 wherein said seal pin is made from a plastic material and said insert is made from metal.

3. In a solenoid-operated fluid control valve having a valve body defining a valve chamber, inlet and outlet passageways each respectively communicating between the exterior of the valve body and the chamber, means defining a valve seat and an outlet orifice opening through the valve seat at the inner end of the outlet passageway, an armature assembly including an impact plungersupported in the chamber for reciprocal movement generally toward and away from the valve seat between one and another position and a seal pin reciprocally mounted on the plunger and having a cylindrical shank portion projecting outwardly from the plunger and toward the valve seat, the seal pin having a seating surface at this outer end for sealing engagement with the valve seat to prevent fluid flow from said chamber through said outlet orifice, a spring yieldably urging the seal pin toward the valve seat and causing the seating surface to engage the valve seat before the plunger completes its movement toward the valve seat to its one position, the plunger being movable relative to the seal pin during an initial portion of plunger travel from its one toward its other position, the seal pin being movable with the impact plunger and out of sealing engagement with the valve seat during a further portion of plunger travel from its one toward its other position, and a solenoid mounted on the valve body for moving the plunger from its one to its other position, the improvement comprising said valve body having a cavity opening inwardly to said chamber and toward said armature assembly, said valve seat and orifice defining means comprising a one piece insert including a base portion received and retained in said cavity and an integral guide portion projecting inwardly from said base portion and toward said armature assembly, said guide portion having a generally radially disposed abutment surface at its inner end for abutting engagement with an associated outer end portion of said impact plunger when said impact plunger is in its one position, said insert having a stepped cylindrical bore extending therethrough in coaxial alignment with said cylindrical shank portion and communicating with said outlet passageway, said bore having an outer end portion defining said outlet orifice and said valve seat, said valve seat surrounding the inner end of said outlet orifice, said bore including a diametrically enlarged inner end portion defining a seal pin guide surface and having a diameter substantially equal to the diameter of said cylindrical shank, said enlarged inner end portion receiving an associated portion of said cylindrical shank for sliding movement therein, said seal pin guide surface being in surrounding sliding engagement with an associated portion of said cylindrical shank at all times and guiding said seal pin in its movements toward and away from said valve seat, said guide portion having a generally radially extending hole therethrough communicating with said chamber and with said enlarged bore portion immediately inwardly of said valve seat and cooperating with said enlarged bore portion, said valve seat and said orifice to provide a fluid flow path from said chamber to said outlet passageway when said plunger is in its other position.

4. The combination as set forth in claim 3 wherein said cavity is cylindrical and said base portion is cylindrical and received in said cavity in press fit assembly with said valve body.

5. The combination as set forth in claim 1 wherein said seal pin is made from plastic material and said insert is made from metal.

6. The combination as set forth in claim 5 wherein said seating surface comprises a conical surface and said valve seat has a radially chamfered surface.

* * * * *

UNITED STATES PATENT OFFICE
CERTIFICATE OF CORRECTION

Patent No. 4,027,850　　　　　　　Dated June 7, 1977

Inventor(s) Walter E. Allen

It is certified that error appears in the above-identified patent and that said Letters Patent are hereby corrected as shown below:

Column 3, lines 20 and 21, "chamber" should be --chamfer--.

Signed and Sealed this thirtieth Day of August 1977

[SEAL]

Attest:

RUTH C. MASON
*Attesting Officer*

C. MARSHALL DANN
*Commissioner of Patents and Trademarks*